(12) United States Patent
Brueckner et al.

(10) Patent No.: US 8,568,042 B1
(45) Date of Patent: Oct. 29, 2013

(54) CAMERA SUPPORT DEVICE AND METHOD RELATED THERETO

(75) Inventors: Peter Gregory Brueckner, Santa Cruz, CA (US); Matthew Thomas Valente, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/402,107

(22) Filed: Feb. 22, 2012

(51) Int. Cl.
*G03B 17/00* (2006.01)
*F16M 11/04* (2006.01)
*F16M 13/00* (2006.01)

(52) U.S. Cl.
USPC .......... 396/428; 248/187.1; 248/561; 248/638

(58) Field of Classification Search
USPC ............... 396/428, 419, 421; 248/187.1, 638, 248/560–561
See application file for complete search history.

(56) References Cited

U.S. PATENT DOCUMENTS

| | | | |
|---|---|---|---|
| 3,467,350 A | 9/1969 | Tyler | |
| 3,703,999 A * | 11/1972 | Forys et al. | 248/550 |
| 4,635,892 A * | 1/1987 | Baker | 248/550 |
| 4,685,649 A | 8/1987 | McKay | |
| 6,065,741 A | 5/2000 | Davis | |
| 6,327,024 B1 * | 12/2001 | Hayashi et al. | 355/53 |
| 7,320,455 B2 | 1/2008 | Ryaboy et al. | |
| 7,726,452 B2 * | 6/2010 | Kraner | 188/378 |
| 7,983,813 B2 * | 7/2011 | Ummethala et al. | 701/37 |

FOREIGN PATENT DOCUMENTS

| | | |
|---|---|---|
| WO | WO 97/31216 | 8/1997 |
| WO | WO 02/35969 | 5/2002 |

OTHER PUBLICATIONS

Isolating Unwanted Vibration from. www.americanmachinist.com—3 pages, May 1, 2005.
Natural Frequencies from www.azimadli.com—1 page, 2009.
Optics Based Research—The Need for Vibration Isolated Rigid Support Structures from www.newport.com—12 pages, Feb. 16, 2012.

* cited by examiner

*Primary Examiner* — Christopher Mahoney
(74) *Attorney, Agent, or Firm* — Dority & Manning, P.A.

(57) ABSTRACT

The present disclosure is directed to a camera support device. The camera support device includes a mounting assembly adapted to releasably mount a camera. The camera support device further includes at least one tuning element in communication with the mounting assembly, the tuning element being adjustable so as to permit tuning of a natural frequency of the mounting assembly.

18 Claims, 3 Drawing Sheets

CAMERA SUPPORT DEVICE AND METHOD RELATED THERETO

FIELD

The present disclosure relates to devices and methods for supporting a camera.

BACKGROUND

Camera stands, such as monopods or tripods, are utilized to stabilize and elevate a camera. Stands can be used for both still and motion photography to prevent camera movement. For instance, stands can be necessary when slow-speed exposures are being made, or when telephoto lenses are used, since camera movement while the shutter is open will produce a blurred image. Stands can also reduce camera shake, and thus can assist with achieving maximum image sharpness. Different stands are available to support a variety of different types of cameras.

However, when capturing very high resolution imagery, even slight perturbations of the camera stand due to vibration can cause blurring of the resulting imagery. This can be a consequence of relatively long exposure times and/or long focal lengths required for certain types of image capture. As such, it becomes important to attempt to isolate environmental vibrations.

Furthermore, even in situations in which a camera for very high resolution imagery is placed on a rigid surface for image capture, camera component movement such as shutter movement, mirror movement, actuation motors, or the like can cause delay in camera setting times.

Conventional camera stands do little to address such issues.

SUMMARY

Aspects and advantages of the invention will be set forth in part in the following description, or may be obvious from the description, or may be learned through practice of the invention.

A need exists for a camera support device that can address the shortcomings of conventional equipment as it relates to high resolution imagery. Methods for capturing high resolution imagery utilizing such devices would be particularly beneficial.

One exemplary implementation of the present disclosure is directed to a camera support device. The camera support device includes a mounting assembly adapted to releasably mount a camera. The camera support device further includes at least one tuning element in communication with the mounting assembly, the tuning element being adjustable so as to permit tuning of a natural frequency of the mounting assembly.

Another exemplary implementation of the present disclosure is directed to a method for adjusting a camera support device. The method includes mounting a camera on a mounting assembly of a camera support device, the mounting assembly configured to releasably mount the camera. The method further includes adjusting a tuning element of the camera support device, the tuning element being in communication with the mounting assembly and the adjustment to the tuning element resulting in tuning of a natural frequency of the mounting assembly and the camera mounted thereon.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
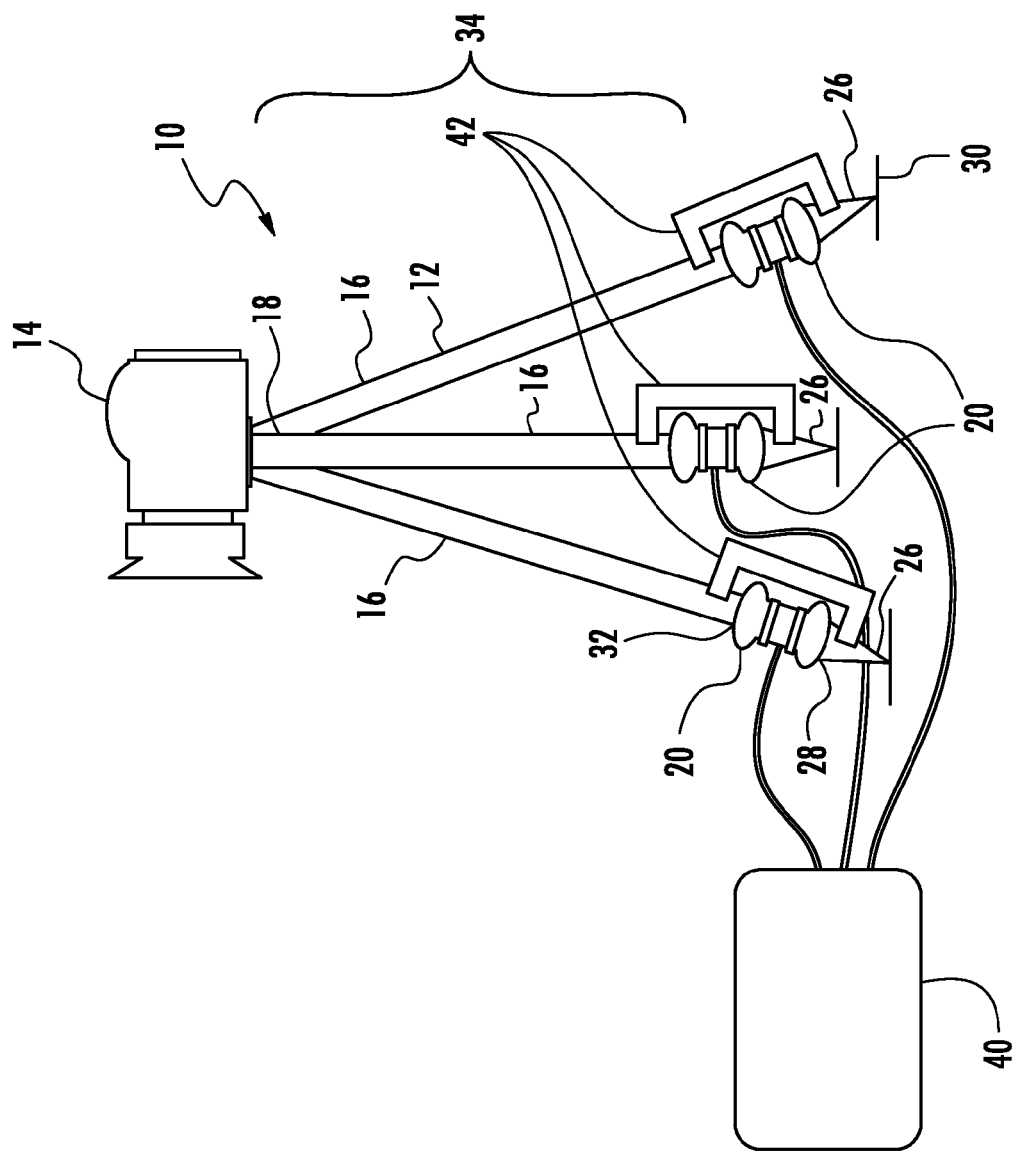
FIG. 1 depicts a camera support system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to a camera support device having a tuning element that permits tuning of a natural frequency of the camera support device. The camera support device of the present disclosure can be utilized with an imaging system to more efficiently capture very high resolution imagery. As used herein, "very high resolution imagery" refers to imagery having a resolution of at least one gigapixel (one billion pixels).

When capturing very high resolution imagery, perturbations of the imaging system due to vibration can cause significant blurring of the resulting imagery. This can occur as a result of the duration of exposure required for such imagery as well as the longer focal length necessary to capture such imagery. As a result, it becomes important to try to isolate environmental vibrations to ensure sufficient image quality for the imagery being captured.

The natural frequency of a surface on which an imaging system is placed can vary greatly. For instance, a rigid concrete surface can have a high natural frequency while less rigid surfaces, such as floors found in modern office buildings, can have a low natural frequency. Moreover, other environmental vibrations can be transmitted to an imaging system via the surface on which the imaging system is placed. Equipment in office buildings such as HVAC systems, loudspeakers, or the like, can transmit energy to the imaging system through the floor.

In accordance with the present disclosure, a camera support device for a camera is provided which incorporates one or more tuning elements to allow a natural frequency of the camera support device and the camera placed thereon to be tuned. In this manner, imagery acquisition can take place more quickly and without the need for interruption due to vibrations. Furthermore, the camera support device of the present disclosure includes the ability to lock out the tuning elements in instances when it is unlikely that environmental vibrations will be transmitted to the camera support device and camera.

Referring to FIG. 1, an exemplary camera support system 10 in accordance with the present disclosure is illustrated. The camera support system 10 includes a camera stand 12 and camera 14.

As illustrated, camera stand 12 is a tripod camera stand but it is contemplated that any suitable camera stand such as a monopod or other camera stand can be utilized in connection with the present disclosure. Camera stand 12 includes a central support (not shown) on which a camera 14 is releasably secured and three leg assemblies 16 that are essentially identical to one another. The central support can be substantially cylinder-shaped and is configured for locking the camera 14 on the central support using any suitable mechanism. For instance, screw threads can be utilized for screwing into a standardized hole in a bottom of the camera 14.

As described herein, the camera 14 is preferably a camera capable of acquiring very high resolution imagery. Any suitable camera configured to acquire very high resolution imagery is contemplated for use with the present disclosure. In this regard, commercially available robotic mounts can be utilized in connection with conventional megapixel digital cameras to capture high resolution imagery. The robotic mount can automate the image acquisition process, triggering the camera to precisely capture images across a grid. Such images can be stitched into a single very high resolution image using conventional software. The software can be present on the camera or can be external to the camera on a processing device in communication with the camera.

In certain configurations, the camera can include an array of megapixel sensors and a ball lens to acquire imagery that undergoes post-capture image processing to produce very high resolution imagery.

The leg assemblies 16 are telescoping so that the camera stand 12 is expandable to an appropriate height. Leg assemblies 16 are elongated and oriented away from one other when camera stand is in use. Upper ends 18 of leg assemblies 16 are pivotally connected to the central support portion using any suitable attachment mechanism, such as one or more hinges, which allow leg assemblies 16 to pivot towards one another and collapse camera stand 12 when not in use 12. The camera stand 12 can be formed from any suitable material such as a rigid plastic, metal, or other suitable material.

Each leg assembly 16 includes a pneumatic element 20. Pneumatic element 20 can be formed from any suitable pneumatic isolator as would be known to one of ordinary skill in the art. While pneumatic elements 20 are illustrated for exemplary purposes, any suitable element which allows tuning of a natural frequency of the mounting assembly can be utilized in combination with or as a substitution for pneumatic elements 20. For example, elements which include mechanisms that are hydraulic, spring-loaded, elastomer-loaded, electromagnetic, magnetostrictive, piezoelectric, magnetorheological, or combinations thereof can be utilized in accordance with the present disclosure as would be understood by one of ordinary skill in the art.

Figure 2:
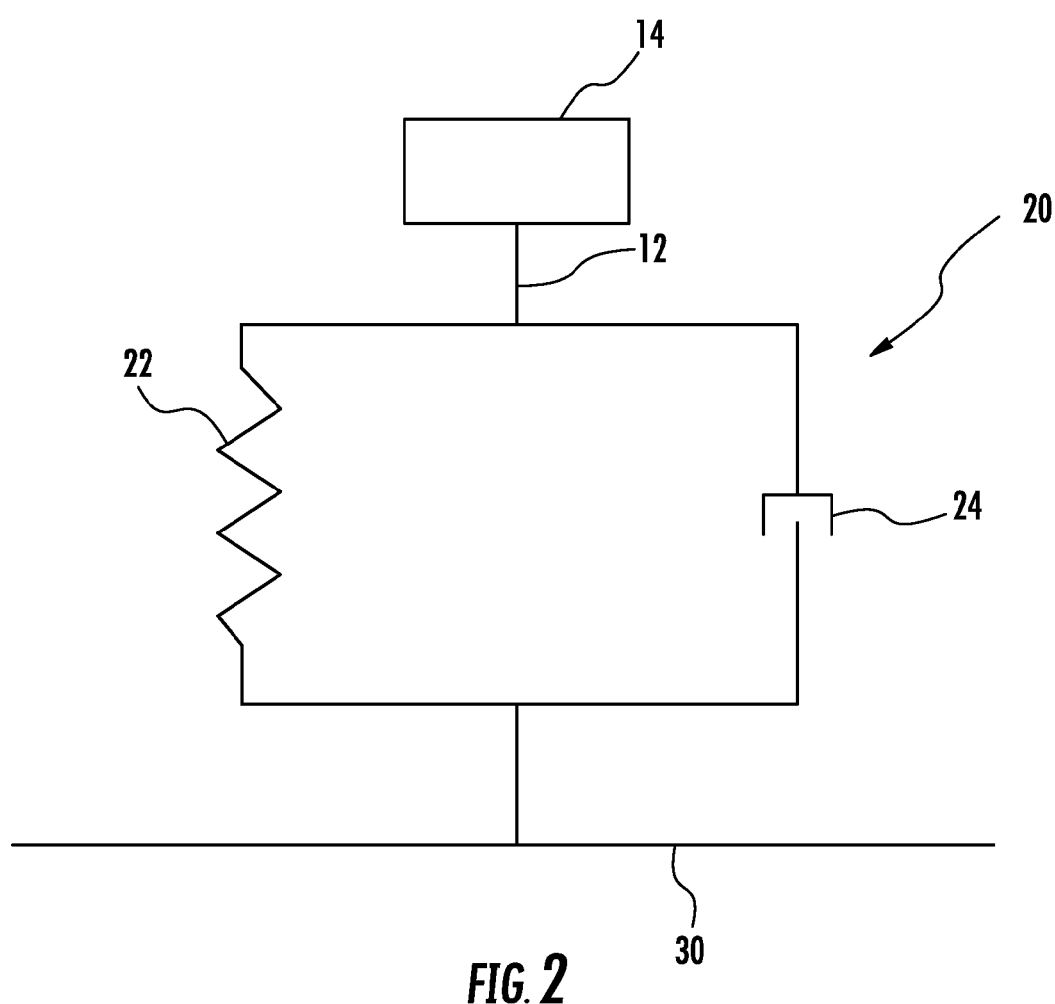
FIG. 2 depicts a schematic illustration of a pneumatic isolator element according to an exemplary embodiment of the present disclosure.

Referring to FIG. 2, a suitable pneumatic element 20 is schematically illustrated. Each pneumatic element includes a spring 22 and pneumatic damper 24. The pneumatic elements 20 are designed to filter vibration before the mechanical noise from surface 30 can pass through camera stand 12 to camera 14. As the value of the spring constant of each pneumatic element is changed (while the mass of the portion of the camera stand above the pneumatic element and camera remain the same), the natural frequency of the overall system can be tuned. The pneumatic elements 20 are joined to a compressor 40 which can vary the air pressure within the pneumatic elements 20 either individually or collectively. The pneumatic elements 20 combine with the camera stand 12 and camera 14 to form a mass/spring/damper system.

The physical structure of the camera stand and camera can be modeled as a number of springs, masses, and dampers. Dampers absorb energy, but springs and masses do not; a spring and a mass interact with one another to form a system that resonates at their characteristic natural frequency. If energy is applied to a spring and mass system, it will vibrate at its natural frequency, and the level of the vibration depends on the strength of the energy source as well as the damping inherent in the system. The natural frequency of an undamped spring and mass system is given by the following equation:

$$F_n = (1/2\pi)\sqrt{(k/m)}$$

where $F_n$ is the natural frequency, k is the spring constant, and m is the mass.

Thus, if the stiffness increases, the natural frequency also increases, and if the mass increases, the natural frequency decreases. If the system has damping (as with the pneumatic element or other contemplated damping features described herein), its natural frequency will be lower, depending on the amount of damping.

The performance of the pneumatic elements are defined primarily by their natural frequency and damping characteristics. Each pneumatic element is a simple harmonic oscillator that acts as a low pass mechanical filter. The pneumatic element is essentially rigid below the natural frequency of the harmonic oscillator and vibration would be passed directly to the portion of the camera stand above the pneumatic element and camera. At the natural frequency vibration is actually amplified. Therefore, the pneumatic elements described herein utilize a lower natural frequency since this improves low frequency isolation and overall isolation bandwidth.

The pneumatic elements also damp the harmonic oscillator amplitude at resonance. This lowers the magnification of vibration at low frequencies and improves system stability.

Referring again to FIG. 1, each pneumatic element 20 can be positioned along any suitable location of each leg assembly 16. As illustrated, each pneumatic element 20 is joined directly to each leg assembly 16. For instance, the pneumatic elements 20 can be positioned near the base 26 of each leg assembly 16 such that each base 26 is joined to the bottom 28 of each pneumatic element 20 and the remainder of each leg assembly 16 is joined to the top 32 of each pneumatic element 20, the remainders of each leg assembly 16 and the central support forming the upper camera stand 34. In addition, each respective pneumatic element 20 can be positioned at a different location along its associated leg assembly 16 from the other pneumatic elements 20.

As described previously, the pneumatic elements utilized in connection with the camera support device described herein can be formed from any suitable pneumatic isolator as would be known by one of ordinary skill in the art. A conventional pneumatic isolator has a natural frequency of about 1.5 to about 3.5 Hz, more specifically from about 2 to about 3 Hz, still more specifically about 2.5 Hz. Such isolators can utilize air pressures from about 60 psi to about 120 psi. Any suitable compressor 40 as would be known to one of ordinary skill in the art can be utilized to provide such air pressures.

Compressor 40 can be in communication with a controller (not shown) that triggers compressor 40 to increase and decrease air pressure within pneumatic elements 20 as needed. Controller can be any suitable controller such as a processor, microcontroller, or other suitable control circuit. Controller can perform software routines in accordance with instructions and data stored in association therewith. For instance, controller can be part of a general purpose computer.

Controller can also be in communication with one or more vibration sensors (not shown) located within upper camera stand 34. The vibration sensor(s) can be any type of suitable sensor, such as an accelerometer, a geophone or displacement sensor that can sense vibration. The vibration sensor(s) can send vibration information to controller regarding real-time vibration measurements enabling controller to trigger compressor 40 to increase or decrease air pressure in pneumatic elements 20.

Through the use of pneumatic elements 20, it is practical to vary the air pressure within each pneumatic element 20 to change the effective spring constant. As the value of the spring constant is changed (while the mass of the upper camera stand 34 and camera 14 remain constant), a natural frequency of the upper camera stand 34 and the camera 14 can be tuned. In this manner, the natural frequency can be tuned such that the upper camera stand 34 and camera 14 are not a harmonic or subharmonic of the floor 30 they are placed upon. As such, vibrations transmit minimal energy to the camera 14 greatly increasing the number of sharp images that can be captured in high vibration areas.

Each leg assembly 16 also includes a lock out device 42. Lock out device 42 can be utilized to lock out the pneumatic element and increase the natural frequency of camera stand 12 and camera 14 in instances where the camera is likely to be the greatest vibratory source. Any suitable lock out devices 42 as would be known to one of ordinary skill in the art can be used to remove the dampening effects of pneumatic elements 20. Lock out device 42 can be engaged when it is unlikely that environmental vibrations will be transmitted to the camera support device and camera. In such situations, it is beneficial to lock out the pneumatic elements to drive the natural frequency as high as possible. As a result, internal camera vibrations such as shutter/mirror movement, actuation motors, or the like will not disrupt the camera stand to as great a degree and shorter settling times can be expected.

Lock out devices 42 can be activated or deactivated by controller in real time based on inputs from sensor device(s). For instance, lock out device 42 can be activated if sensor device(s) detect that environmental vibration from surface 30 is insignificant. Lock out device can then be deactivated if sensor device(s) detect environmental vibration from surface 30.

Figure 3:
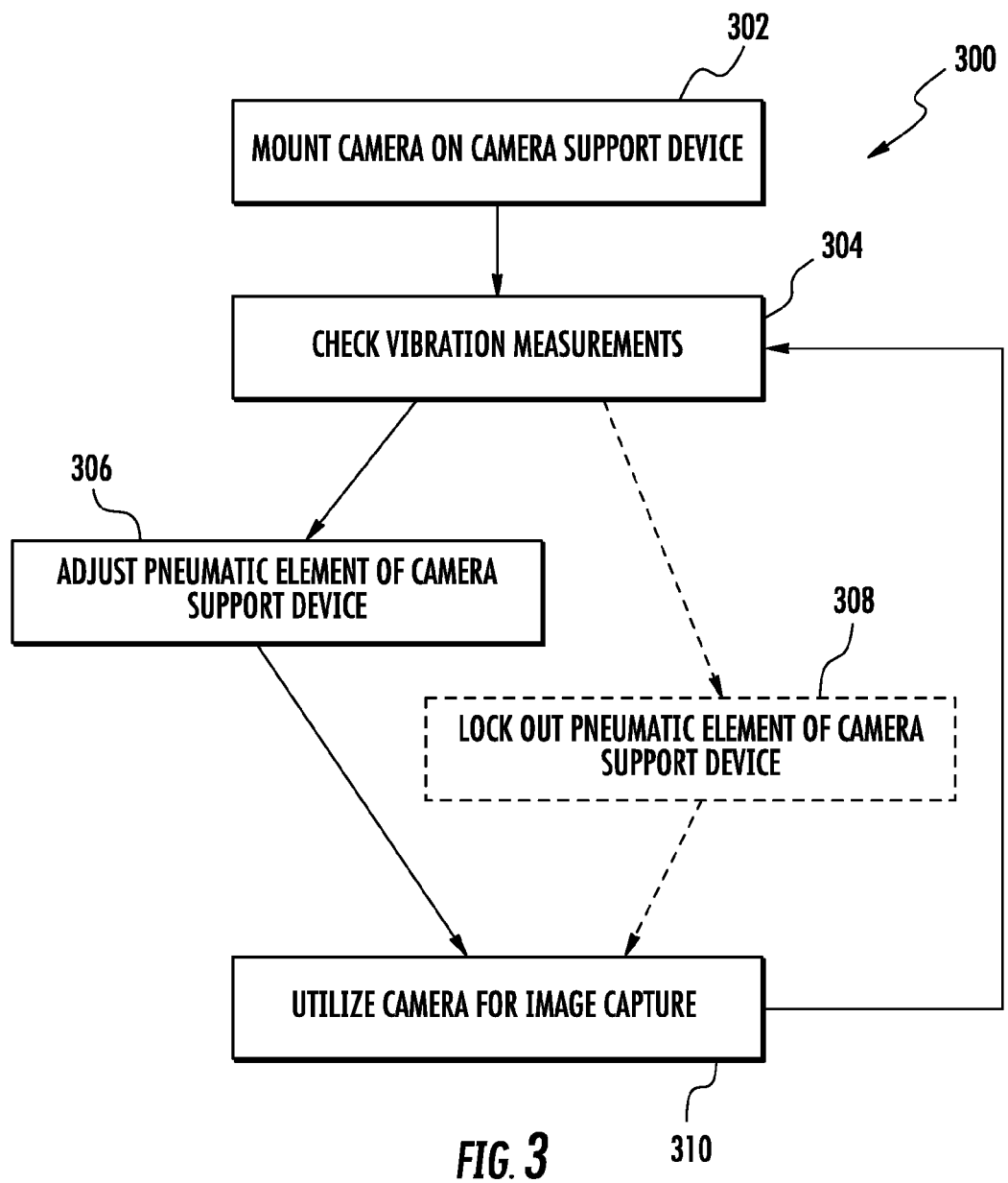
FIG. 3 depicts a flow diagram of an exemplary method according to an exemplary embodiment of the present disclosure.

FIG. 3 depicts a flow chart of an exemplary method 300 for adjusting a camera support device according to an exemplary embodiment of the present disclosure. While the method 300 will be discussed with reference to the device 10 of FIG. 1, those of ordinary skill in the art will understand that the exemplary method can be performed by other suitable camera support devices in accordance with the present disclosure.

At (302), the method mounts a camera to the camera support device of the present disclosure. Referring again to FIG. 1, the camera 14 can be removably mounted at any suitable location of camera stand 12.

Turning back to FIG. 3, at (304), the method checks vibration measurements to determine whether adjustments are needed to the pneumatic elements of camera support device. Vibration measurements can be detected using one or more sensor device(s) as described herein. In a particular implementation, vibration measurements are sent to a controller for real time determination as to whether such measurements are within a predetermined range for tuning.

At (306), the method can adjust one or more pneumatic elements of camera support device to tune a natural frequency of the upper camera stand and camera. Again, however, any suitable tuning element(s) can be utilized in connection with the present method. Referring back to FIG. 1, compressor 40 can increase and decrease air pressure within pneumatic elements 20 as required. In this manner, the natural frequency can be tuned such that the upper camera stand 34 and camera 14 are not a harmonic or subharmonic of the floor 30 they are placed upon. In implementations in which a controller is present, the controller can activate and deactivate compressor as needed based on real time vibration measurements.

Optionally, referring again to FIG. 3, the method can include at (308) locking out of the pneumatic element of camera support device in response to the vibration measurements. One or more lock out devices (corresponding to the one or more pneumatic elements) can be provided for this purpose. If the camera support device is on a very rigid floor, such as a concrete slab foundation, it is unlikely for environmental vibrations to be able to be transmitted to the camera support device and camera mounted thereon. In such instances, it is helpful to lock out the pneumatic elements entirely to drive the natural frequency as high as possible. In implementations utilizing a controller, the controller can activate and deactivate the lock out devices based on real time vibration measurements.

At (310), the method includes utilizing the camera mounted on the camera support device for image capture. As described above, commercially available robotic mounts can be utilized with conventional megapixel digital cameras to capture high resolution imagery through an automated image acquisition process that triggers the camera to precisely capture images across a grid. At any point during this acquisition, the real time vibration measurements at (304) can result in adjustments at (306) or, optionally, (308) until such time as image capture is complete. The acquired images can be stitched into a single very high resolution image.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A camera support device comprising:
    a mounting assembly adapted to releasably mount a camera;
    at least one tuning element in communication with the mounting assembly, the tuning element being adjustable so as to permit tuning of a natural frequency of the mounting assembly; and
    a lock out element configured to lock out the tuning element and increase the natural frequency of the mounting assembly.

2. The device of claim 1, wherein the tuning element comprises a pneumatic element that is adjustable by varying air pressure therein.

3. The device of claim 2, further comprising a compressor, the compressor configured to adjust air pressure within the pneumatic element.

4. The device of claim 3, further comprising an electronic control system, the electronic control system configured to control the compressor.

5. The device of claim 1, wherein the mounting assembly is rotatable.

6. The device of claim 1, wherein the support device further comprises an elongate leg member joined to the mounting assembly, the leg member configured to support the mounting assembly, wherein the leg member includes the tuning element as a part thereof.

7. The device of claim 1, wherein the support device further comprises a plurality of elongate leg members, the leg members each configured to partially support the mounting assembly, wherein each respective leg member includes a tuning element as a part thereof.

8. The device of claim 7, wherein the support device comprises three elongate leg members that are pivotally joined to the mounting assembly so as to enable the three legs to form a tripod for supporting the mounting assembly.

9. The device of claim 7, wherein each of the plurality of elongate leg members are capable of telescoping.

10. The device of claim 1, further comprising an electronic control system capable of receiving information about the natural frequency of the mounting assembly and adjusting the tuning element in response.

11. A method for adjusting a camera support device comprising:
mounting a camera on a mounting assembly of a camera support device, the mounting assembly configured to releasably mount the camera;
adjusting a tuning element of the camera support device, the tuning element being in communication with the mounting assembly and the adjustment to the tuning element resulting in tuning of a natural frequency of the mounting assembly and the camera mounted thereon, wherein the camera support devices further comprises a lock out element configured to lock out the tuning element and increase the natural frequency of the mounting assembly.

12. The method of claim 11, wherein the tuning element comprises a pneumatic element, the tuning element being adjusted by changing air pressure within the pneumatic element.

13. The method of claim 12, wherein the air pressure within the pneumatic element is increased.

14. The method of claim 12, wherein the air pressure within the pneumatic element is decreased.

15. The method of claim 11, further comprising adjusting the lock out element configured to lock out the tuning element and increase the natural frequency of the mounting assembly and the camera mounted thereon.

16. The method of claim 11, wherein the support device further comprises an elongate leg member joined to the mounting assembly, the leg member supporting the mounting assembly and the camera mounted thereon, wherein the leg member includes the tuning element as a part thereof.

17. The method of claim 11, wherein the support device further comprises a plurality of elongate leg members, each of the leg members partially supporting the mounting assembly and the camera mounted thereon, wherein each respective leg member includes a tuning element as a part thereof.

18. The method of claim 11, further comprising:
utilizing the camera to capture an image after the tuning element has been adjusted to tune the natural frequency of the mounting assembly and the camera mounted thereon.

* * * * *